(12) United States Patent
Dierickx

(10) Patent No.: US 7,106,373 B1
(45) Date of Patent: Sep. 12, 2006

(54) METHOD FOR INCREASING DYNAMIC RANGE OF A PIXEL BY MULTIPLE INCOMPLETE RESET

(75) Inventor: Bart Dierickx, Mortsel (BE)

(73) Assignee: Cypress Semiconductor Corporation (Belgium) BVBA, Mechelen (BE)

( * ) Notice: Subject to any disclaimer, the term of this patent is extended or adjusted under 35 U.S.C. 154(b) by 0 days.

(21) Appl. No.: 09/460,473

(22) Filed: Dec. 14, 1999

Related U.S. Application Data

(63) Continuation-in-part of application No. 09/021,011, filed on Feb. 9, 1998, now Pat. No. 6,011,251.

(51) Int. Cl.
H04N 3/14 (2006.01)
H04N 5/335 (2006.01)

(52) U.S. Cl. .................................................. 348/308
(58) Field of Classification Search ............ 250/208.1, 250/214 R; 348/294, 296, 297, 299–302, 348/307–311, 314
See application file for complete search history.

(56) References Cited

U.S. PATENT DOCUMENTS

| | | | |
|---|---|---|---|
| 3,770,968 A | 11/1973 | Hession et al. | |
| 3,904,818 A | 9/1975 | Kovac | |
| 4,253,120 A | 2/1981 | Levine | |
| 4,473,836 A | 9/1984 | Chamberlain | 257/290 |
| 4,565,756 A | 1/1986 | Needs | 430/7 |
| 4,580,103 A | 4/1986 | Tompsett | 330/9 |
| 4,647,975 A | 3/1987 | Alston et al. | 348/222.1 |
| 4,703,169 A | 10/1987 | Arita | 250/214 R |
| 5,146,074 A | 9/1992 | Kawahara et al. | 250/208.1 |
| 5,153,420 A | 10/1992 | Hack et al. | 250/208.1 |
| 5,164,832 A | 11/1992 | Halvis et al. | 348/250 |
| 5,258,845 A | 11/1993 | Kyuma et al. | 348/299 |
| 5,283,428 A * | 2/1994 | Morishita et al. | 250/214.1 |
| 5,296,696 A | 3/1994 | Uno | 250/208.1 |
| 5,321,528 A | 6/1994 | Nakamura | 348/241 |
| 5,329,112 A | 7/1994 | Mihara | 250/208.1 |
| 5,335,008 A | 8/1994 | Hamasaki | 348/301 |
| 5,608,204 A | 3/1997 | Hofflinger et al. | 250/208.1 |
| 5,614,744 A | 3/1997 | Merrill | 257/291 |
| 5,742,047 A | 4/1998 | Buhler et al. | |
| 5,841,126 A | 11/1998 | Fossum | 250/208.1 |
| 5,861,621 A * | 1/1999 | Takebe | 250/214 R |

(Continued)

FOREIGN PATENT DOCUMENTS

EP 548 987 6/1993

(Continued)

OTHER PUBLICATIONS

Aoki, Tadashi, et al., "A Collinear 3-Chip Image Sensor," *IEEE International Solid-State Circuits Conference*, 1965, 3 pages.

(Continued)

*Primary Examiner*—Ngoc-Yen Vu
*Assistant Examiner*—Jason Whipkey
(74) *Attorney, Agent, or Firm*—Blakely, Sokoloff, Taylor & Zafman LLP

(57) ABSTRACT

A method is disclosed for obtaining a read-out signal of a pixel having at least a photosensitive element with a charge storage node. Charge carriers are converted from radiation impinging on the photosensitive element. While acquiring charge carriers on said charge storage node, after a time period at least one reset pulse with a predetermined amplitude is applied on said charge storage node, said pulse resetting incompletely the charge carriers acquired at the moment of applying said pulse; and thereafter charge carriers are further acquired on said charge storage node.

13 Claims, 7 Drawing Sheets

U.S. PATENT DOCUMENTS

| | | | | |
|---|---|---|---|---|
| 5,872,596 | A | * | 2/1999 | Yanai .......................... 348/297 |
| 5,933,190 | A | * | 8/1999 | Dierickx ...................... 348/302 |
| 5,953,060 | A | * | 9/1999 | Dierickx ...................... 348/308 |
| 6,011,251 | A | * | 1/2000 | Dierickx et al. .......... 250/208.1 |
| 6,133,563 | A | | 10/2000 | Clark et al. |
| 6,316,760 | B1 | * | 11/2001 | Koyama ................... 250/208.1 |
| 6,459,077 | B1 | * | 10/2002 | Hynecek .................. 250/208.1 |
| 6,570,618 | B1 | * | 5/2003 | Hashi .......................... 348/314 |

FOREIGN PATENT DOCUMENTS

| | | |
|---|---|---|
| EP | 657 863 | 6/1995 |
| EP | 0 739 039 | 10/1996 |
| EP | 739 039 | 10/1996 |
| EP | 0 260 954 | 2/1997 |
| EP | 0 773 669 | 5/1997 |
| EP | 0 635 973 | 8/1998 |
| EP | 0 858 111 | 8/1998 |
| EP | 0 858 212 | 8/1998 |
| GB | 2324651 | 10/1998 |
| WO | 93/19489 | 9/1993 |
| WO | WO 99/16238 | 4/1999 |

OTHER PUBLICATIONS

Horii, Kenji, et al., "A 490×404 Element Imager for a Single-Chip Color Camera," *IEEE International Solid-State Cricuits Conference*, 1965, 2 pages.

Nagakawa, Tadashi, et al., "A 580×500-Element CCD Imager with a Shallow Flat P Well," *IEEE International Solid-State Circuits Conference*, 1985, 2 pages.

Mahowald, M.A., "Silicon Retins with Adaptive Photoreceptors," *SPIE*, vol. 1473, 1991, pp. 52-58.

Mann, J., "Implementing Early Visual Processing In Analog VLSI: Light Adaptation," *SPIE*, vol. 1473, 1991, pp. 128-136.

Ono, Hideyuki, et al., "Analysis of Smear Noise in Interline-CCD Image Sensor with Gate-Free Isolation Structure," *Japanese Journal of Applied Physics*, vol. 30, No. 12B, Dec. 1991, pp. 3621-3626.

Yadid-Pecht, Orly, et al., "A Random Access Photodiode Array for Intelligent Image Capture," *IEEE Transactions on Electron Devices*, vol. 38, No. 8, Aug. 1991, pp. 1772-1780.

Ricquier, N., et al., "Pixel Structure with Logarithmic Response for Intelligent and Flexible Imager Architectures," *Microelectronic Engineering*, vol. 19, 1992, pp. 631-634.

Sevenhans, J.M., et al., "A 400mm Long Linear X-Ray Sensitive Image Sensor", *ISSCC Digest of Technical Papers*, 1987, 4 pages.

Anderson, S. et al., "A Single Chip Sensor & Image Process or Fingerprint Verification," *IEEE 1991 Custom Integrated Circuits Conference*, May 12-15, 1991, pp. 12.1.1-12.1.4.

Dierickx, Bart, "XYW Detector: A Smart Two-Dimensional particles Senors," *Nuclear Instruments and Methods in Physics Research A275*, North-Holland Physics Publishing Division, 1969, pp. 542-544.

Klein, P., et al., "Design and Performance of Semiconductor Detectors with Integrated Amplification and Charge Storage Capability," *Nuclear Instruments and Methods in Physics Research A305*, 1991, pp. 517-526.

Aw, Chye Huat, et al., "A 128×128-Pixel Standard-CMOS Image Sensor with Electronic Shutter," *IEEE Journal of Solid State Circuits*, vol. 31, No. 12, Dec. 1996, pp. 1922-1930.

Martin, W.J. et al., "Dynamic Offset Null," *IBM Technical Disclosure Bulletin*, No. 23, No. 9, Feb. 1981, pp. 4195-4196.

Aoki et al., "A Collinear 3-Chip Image Sensor", *IEEE International Solid-State Circuits Conference*, 1985, pp. 102-103.

Horii et al., "A 490×404 Element Imager for a Single-Chip Color Camera", *IEEE International Solid-State Circuits Conference*, 1985, pp. 96-97.

Nagakawa et al., "A 580×500-Element CCD Imager with a Shallow Flat P Well", *IEEE International Solid-State Circuits Conference*, 1985, pp. 98-99.

Mahowald, M.A., "Silicon Retina with Adaptive Photoreceptors", *SPIE*, vol. 1473, 1991, pp. 52-58.

Mann, J. "Implementing Early Visual Processing In Analog VLSI: Light Adaptation", *SPIE*, vol. 1473, 1991, pp. 128-136.

Ono et al., "Analysis of Smear Noise In Interline-CCD Image Sensor with Gate-Free Isolation Structure", Abstract of the 1991 Int'l Conference on Solid State Devices and Materials, Yokohama, 1991, pp. 68-70.

Yadid-Pecht et al., "A Random Access Photodiode Array for Intelligent Image Capture", *IEEE Transactions on Electron Devices*, vol. 38, No. 8 Aug. 1991.

Ricquier et al., "Pixel Structure with Logarithmic Response for Intelligent and Flexible Imager Architectures", *Microelectronic Engineering*, 19(1992), pp. 631-634.

Sevenhans, et al., "A 400mm Long Linear X-Ray Sensitive Image Sensor", *IEEE International Solid-State Circuits Conference*, 1987, pp. 108-109.

Anderson, S. et al., "A Single-Chip Sensor & Image Processor or Fingerprint Verification", *IEEE 1991 Custom Integrated Circuits Conference*, May 12-15, 1991, pp. 12.1.1-12.1.4.

Dierickx, Bart, "XYW Detector: A Smart Two-Dimensional Particle Sensor", *Nuclear Instruments and Mthods in Physics Research A275*, North-Holland Physics Publisihing Division, 1989, pp. 542-544.

Klein, P., "Design and Performance of Semiconductor Detectors with Integrated Amplification and Charge Storage Capability", *Nuclear Instruments and Methods in Physics Research A305*, 1991, pp. 517-526.

Aw, Chye Huat, et al., "A 128×128-Pixel Standard-CMOS Image Sensor with Electronic Shutter", *IEEE Journal of Solid State Circuits*, vol. 31, No. 12, Dec. 1996, pp. 1922-1930.

Martin, W.J. et al., "Dynamic Offset Null", *IBM Technical Disclosure Bulletin*, No. 23, No. 9, Feb. 1981, pp. 4195-4196.

\* cited by examiner

METHOD FOR INCREASING DYNAMIC RANGE OF A PIXEL BY MULTIPLE INCOMPLETE RESET

CLAIM OF PRIORITY

This application is a continuation-in-part application of U.S. patent application Ser. No. 09/021,011, filed Feb. 9, 1998, issued as U.S. Pat. No. 6,011,251 on Jan. 4, 2000.

FIELD OF THE INVENTION

The present invention relates to solid state imaging devices. More particularly, the present invention is related to a method of obtaining a read-out signal with a large dynamic range on an imaging device with a pixel structure.

BACKGROUND OF THE INVENTION

Solid state image sensors are well known. Virtually all solid-state imaging sensors have as key element a photosensitive element being a photoreceptor, a photo-diode, a photo-transistor, a CCD gate, or alike. Typically, the signal of such a photosensitive element is a current which is proportional to the amount of electromagnetic radiation (light) falling onto the photosensitive element.

A structure with a photosensitive element included in a circuit having accompanying electronics is called a pixel. Such pixel can be arranged in an array of pixels so as to build focal plane arrays.

Commonly such solid state image sensors are implemented in a CCD-technology or in a CMOS- or MOS-technology. Solid state image sensors find a widespread use in devices such as camera systems. In this embodiment a matrix of pixels comprising light sensitive elements constitutes an image sensor, which is mounted in the camera system. The signal of said matrix is measured and multiplexed to a so-called video-signal.

Of the image sensors implemented in a CMOS- or MOS-technology, CMOS or MOS image sensors with passive pixels and CMOS or MOS image sensors with active pixels are distinguished. An active pixel is configured with means integrated in the pixel to amplify the charge that is collected on the light sensitive element. Passive pixels do not have said means and require a charge sensitive amplifier that is not integrated in the pixel. For this reason, active pixel image sensors are potentially less sensitive to noise fluctuations than passive pixels. Due to the additional electronics in the active pixel, an active pixel image sensor may be equipped to execute more sophisticated functions, which can be advantageous for the performance of the camera system. Said functions can include filtering, operation at higher speed or operation in more extreme illuminations conditions.

Examples of such imaging sensors are disclosed in EP-A-0739039, in EP-A-0632930 and in U.S. Pat. No. 5,608,204. The imaging devices based on the pixel structures as disclosed in these patent applications however are still subject to deficiencies in the image quality of the devices.

There is an ongoing effort to increase the performance of CMOS or MOS image sensors such that a comparable image quality is obtained as the one obtained with high end CCD imagers. Due to the miniaturisation of the technology of CMOS based electronic circuits, it is further possible to realise complex CMOS- or MOS-based pixels as small as CCD-based pixels. It is a main advantage of CMOS- or MOS-based image sensors that CMOS technology is being offered by most foundries whereas CCD-technology is rarely offered and a more complex and expensive technology option.

In the co-pending patent applications and patents EP96870050.0, U.S. Pat. No. 5,933,190, EP98870025.8, EP98944905.3, EP96870133.4, EP98870024.1, and U.S. Pat. No. 5,953,060 pixel structures and methods of addressing them are described which address the issues summarised hereabove. The contents of these patent applications are incorporated herein by reference.

In general, it must be recognised that for an imaging device, three specifications that are difficult to match are to be met:

the sensitivity of the image device, especially in the dark, the cosmetic quality of the image (this means that the image should be flawless), and the requirement of a response with a high dynamic range.

Image sensors having a non-linear response such as a logarithmic response are known from, e.g. EP-A-0739039.

However, most of the image sensors with passive or active pixels have a linear voltage-to-light response. This means that their dynamic range is limited by the dynamic range of the linear response. For instance, if the linear output voltage has an S/R ratio of about 250 (which is a typical value) the corresponding dynamic range will be the same.

Image sensors with a double linear response or multiple linear response are known. In such sensors, two or more linear pieces of optical response are combined in one electrical output signal, outside the pixel. Presently, the classical image sensors can be used to obtain such double linear response image by capturing two images with different sensitivity and combining them.

Document U.S. Pat. No. 5,164,832 discloses a CCD-circuit having a response curve that has two sensitivity ranges. The CCD circuit has a clipping gate that is in a parallel configuration on the CCD. In order to obtain a response curve, the light integration period is splitted in a first and second integration periods. During the first integration period, the clipping gate is set to a specific DC voltage that removes the signals being generated by a high light intensity impinging on the CCD. During the second integration period, this limitation is removed. The high signals will only add to the result during the second period only, low signals will add all the time.

The collected photocharge during the first period of the integration time is limited, during the second period, the limitation is removed. This limitation that can be removed is obtained with a clipping gate that is set to one DC voltage during the first period, and to another during the second period. This said gate continuously removes charge that is in excess.

AIMS OF THE INVENTION

The present invention aims to disclose an active or passive pixel of an imaging device such that with one single pixel, a double or multiple linear, voltage-to-light/radiation response can be obtained.

The present invention further aims to disclose a method of reading out an active or passive pixel of an imaging device such that a double or multiple linear voltage-to-light/radiation response can be obtained in one single image or read-out scan.

SUMMARY OF THE PRESENT INVENTION

The present invention is related to the read-out signal acquired on a device for imaging applications that has included an array or sensor of pixels. The method of the invention aims to realise a double-linear or multiple linear light/radiation-to-voltage response in a single pixel. The method of the invention can be executed on a pixel having at least a photosensitive element with a charge storage node. In an embodiment of the invention, the photosensitive element can have a parasitic capacitor, said charge storage node thereby being an output node of said photosensitive element, the parasitic capacitor of the photosensitive element being used as a capacitor memory element. The pixel can further comprise a reset transistor being in series with said photosensitive element, and an amplifying element connected to said charge storage node, the amplifying element amplifying or buffering the signal on said charge storage node for further signal processing.

In a first aspect of the invention, a method is disclosed for obtaining a read-out signal of a pixel having at least a photosensitive element with a charge storage node, the method comprising the steps of while acquiring charge carriers on said charge storage node, said charge carriers being converted from radiation impinging on the photosensitive element: after a time period applying at least one reset pulse with a predetermined amplitude on said charge storage node, said pulse resetting incompletely the charge carriers acquired at the moment of applying said pulse; and thereafter further acquiring charge carriers on said charge storage node. The moment of applying said pulse is at the end of the time period. The read-out signal thereby is a combination of signals acquired prior to and after the application of said pulsed reset signal. Depending on the relative amplitudes of the reset pulse and of the actual signal resulting directly from the charge carrier acquisition, the resulting read-out signal can be different or identical to a signal acquisition method wherein said reset pulse is not applied. Thus it may happen that the reset pulse is not resetting the charge carriers acquired at the moment of applying said pulse. Both possible resulting signals are denoted as a combination of signals acquired prior to and after the application of said pulsed reset signal. The reset pulse is adapted for forcing a signal on the charge storage node, and the resulting read-out signal can be different to the case wherein said reset pulse is not applied. The amplitude of the reset pulse can be within the range of read-out signal acquisition. The amplitude of the reset pulse can also be of an other order of magnitude than the range of read-out signal acquisition.

According to an embodiment of this first aspect of the invention a plurality of reset pulses can be applied on said charge storage node. At least two of said plurality of reset pulses can have a different amplitude. The method can further comprise the step of applying a reference signal on said charge storage node whereon said reset pulse is superposed, the amplitude of the resulting superposed signal being within the range of read-out signal acquisition.

The method of the invention can also comprise the step of applying a prior pulsed reset signal on said charge storage node, prior to the step of acquiring charge carriers on said charge storage node. During the time of application of said prior pulsed reset signal and during the time of application of said pulsed reset signal on said charge storage node, acquisition of charge carriers is blocked. In another embodiment of the invention, said pulsed reset signal is forcing a voltage on said charge storage node and during the time of application of said pulsed reset signal on said charge storage node, acquisition of charge carriers is blocked.

According to the first and to other aspects of the invention, the present invention is related to a method for obtaining a non-linear photocurrent to voltage response from a pixel in an imaging sensor or in an imaging device, by applying reset pulses of different amplitudes on a pixel having at least a charge storage node and at least one reset transistor connected to and acting upon this node. The pixel can have at least a charge storage node and a reset transistor acting upon this node, and an amplifying element amplifying or buffering the voltage on this node for further readout or processing. During an image acquisition period reset pulses with various amplitudes are applied on the node. The charge storage node can be identical to the photodiode node. During an image acquisition period also reset pulses with constant amplitudes can be applied, these reset pulses discharging said storage node to variable levels, these levels being imposed by a variable drain voltage of the reset transistor, or by a variable gate voltage applied on a transistor in series with the reset transistor.

Any of the embodiments or examples or aspects of the method of the can be combined in order to achieve advantageous imaging devices.

DETAILED DESCRIPTION OF THE PRESENT INVENTION

The invention is described in the sequel through a detailed description of several embodiments of the invention. It is obvious that other embodiments of the invention can be configured according to the knowledge of persons skilled in the art without departing form the true sprit of the invention, the invention being limited only by the terms of the appended claims.

The present invention is related to a method for obtaining a read-out signal of a pixel having at least a photosensitive element with a charge storage node, the method comprising the steps of while acquiring charge carriers on said charge storage node, said charge carriers being converted from radiation impinging on the photosensitive element: after a time period applying at least one pulsed reset signal with a predetermined amplitude on said charge storage node, said amplitude being within the range of read-out signal acquisition; and thereafter further acquiring charge carriers on said charge storage node. The read-out signal thereby is a combination of signals acquired prior to and after the application of said pulsed reset signal. Depending on the relative amplitudes of the pulsed reset signal and of the actual signal resulting directly from the charge carrier acquisition, the resulting read-out signal can be different or identical to a signal acquisition method wherein said pulsed reset signal is not applied. Both possible resulting signals are denoted as a combination of signals acquired prior to and after the application of said pulsed reset signal. The method of the invention can also comprise the step of applying a prior pulsed reset signal on said charge storage node, prior to the step of acquiring charge carriers on said charge storage node. During the time of application of said prior pulsed reset signal and during the time of application of said pulsed reset signal on said charge storage node, acquisition of charge carriers is blocked.

Figure 1:
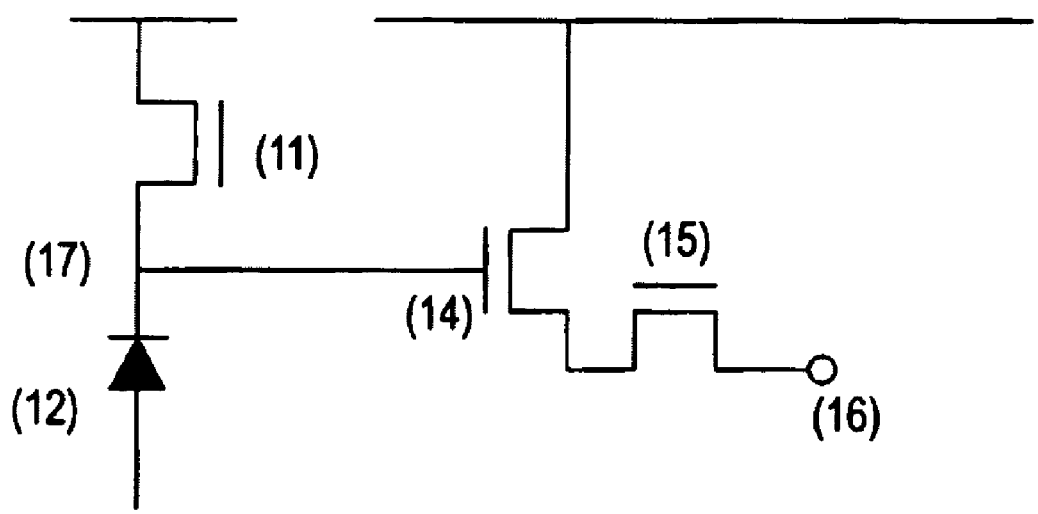
FIG. 1 represents an embodiment of a pixel on which the invention can be applied. Shown in the figure are a photodiode (12), the photodiode node being the charge storage node (13), and a reset transistor (11) as well as an amplifying element (14). A switch transistor (15) connects the pixel to the column output (16) whereon the output voltage is taken. The photodiode has an output node which serves as the charge storage node (17).

The method of the invention can be applied to a pixel as e.g. the classic 3-transistor (3T) integrating active pixel of an imaging device as disclosed in the paper "A Random Access Photodiode Array for Intelligent Image Capture" IEEE Transactions El. Dev. 38 (8), 1772 (1991) the teaching of U.S. Pat. No. 5,933,190 can by the person of skill in the art be converted to an integrating pixel structure and the method of the invention can be applied to the 3-transistor (3T) pixel disclosed therein. The patent application EP98870025.8 also discloses a 3T pixel to which the method of the invention can be applied. The teaching of above-referenced documents is incorporated by reference in the present patent application. A 3T-pixel is shown in FIG. 1. The pixel has a reset terminal or transistor (11) for applying a pulsed reset signal. The pixel has a photodiode (12) and a charge storage node (17) and an amplifying element or transistor (14). The method of the invention can also be applied to any pixel that has a node with a reset transistor and a memory element such as a capacitor for charge storage. In the 3T pixel, the capacitor is the parasitic capacitor of the photodiode. In the embodiment of the invention described in the sequel, said reset pulse signal is forcing a voltage on said charge storage node (17) and during the time of application of said reset pulse on said charge storage node (17), acquisition of charge carriers is blocked. By applying the method of the invention to the pixel described hereabove, the resulting read-out signal is not a linear function of the amount of light received, but has a double linear slope, or even a multiple linear slope, or a combination of linear and non-linear slopes. The slope of the read-out signal (the slope of output voltage versus light intensity or integration time) can be varied by the electronic shutter (the application of the reset pulse signal for the present invention). The slope of the read-out signal (the slope of output voltage versus light intensity or integration time) corresponding to a lower sensitivity (light to voltage), can be varied by the electronic shutter. Thus, the method of the invention can be described as a facility to reduce the duration of the observation time of a pixel. The double or multiple slope method has a different effect on the high intensity part of an image compared to the low intensity part. It compresses the high intensity part of an image, but preserves the low intensity part. It has a comparable property as a gamma correction or as a logarithmic compression, which are known to the person of skill in the art, yet it can be tuned within a wide range to accomodate various light conditions.

The best mode embodiment of the invention for reading the signal of the pixel in order to obain the double linear slope, as applied to a 3T-pixel is explained herebelow.

Figure 2:
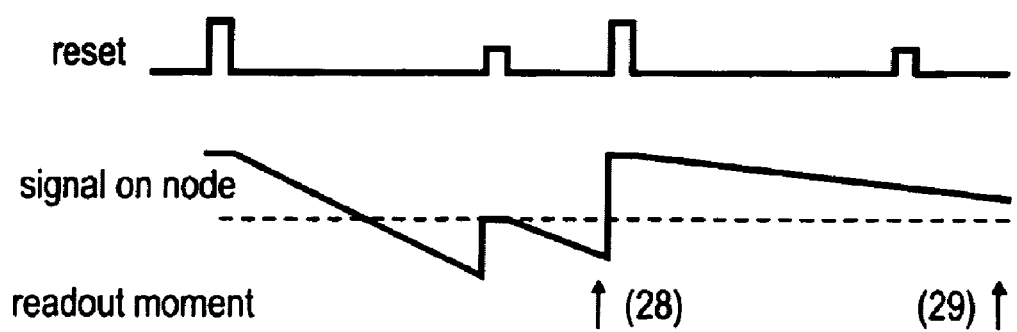
FIG. 2 represents a graph of the different signals applied according to the method of the invention to the transistors of the pixel shown in FIG. 1.

In FIG. 2, the pulses applied to terminal or transistor reset (11) of the pixel, and the potential level seen on the photodiode node (12) of the 3T-pixel are shown in a schematic way. The period prior to the first readout moment (arrow 28) is in case of a high light intensity. In the beginning of this first period, the photodiode node (or charge storage node) (17) is discharged by the application of a prior pulsed reset signal on said charge storage node. This prior reset pulse forces a voltage on the node (17) and during the time of application of this prior reset pulse, there is no integration of charge carriers taking place. After this prior reset pulse signal, by accumulation or acquisition of photocharges the voltage on the node (17) drops. A lower-amplitude reset pulse (reset pulse with a lower amplitude than the prior reset pulse) will discharge the node partially. The arrow (28) indicates the time moment where the pixel is read out. The period after the first readout moment (28) and prior to the second readout moment (29) is the case where the light intensity is low. Here also the voltage drops, but slower. The second, lower amplitude (which is of the same amplitude as the reset pulse in the first period) reset pulse will not discharge the photodiode. As a result, when the light level is low, the full time lapse between two prior reset pulse of a 'high' amplitude is used for light detection. When the light level becomes so high that the charge is partially reset by the low amplitude reset pulse, the additional signal is only the light accumulated after the lower reset pulse and the final read-out signal has a different voltage than in the case of a low light intensity.

Other embodiments of the invention are described in the sequel.

Figure 3:
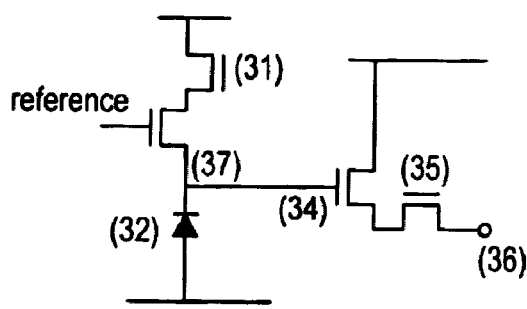
FIGS. 3 and 4 represent pixels for applying alternate embodiments of the invention.
Figure 4:
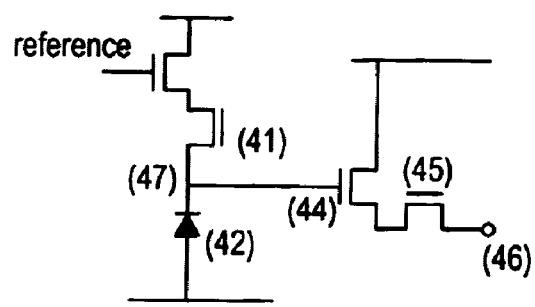
Figure 5:
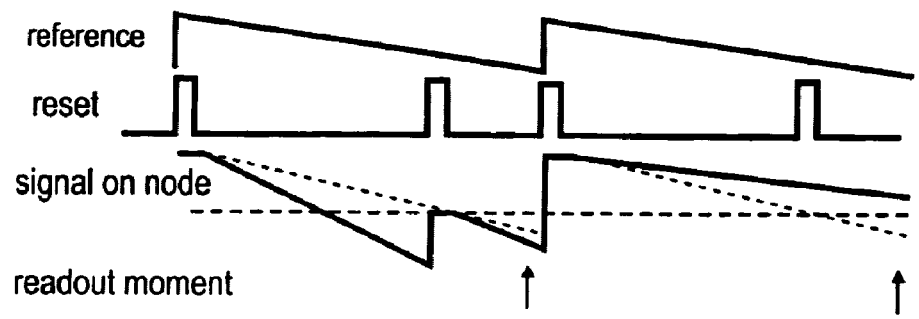
FIG. 5 represents a graph showing an alternate embodiment of the methods of the invention as applied to the pixels of FIGS. 4 and 5

FIGS. 3 and 4 and FIG. 5 show alternate pixel configurations and signal characteristics according to an alternate embodiment of the invention. In the method of the best mode embodiment, the amplitude of the reset pulse was modulated. The method shown in FIG. 5 uses a fixed amplitude for the prior reset pulse and the reset pulse. A reference voltage (FIG. 3) is applied to a transistor in between the reset transistor and the photodiode or storage node. The reference voltage may be varied in steps, pulses or continuously during the image aquisition period of the pixel. In this method the charge storage node (37)(47) is reset to a level determined by the reference voltage. The reference voltage may slowly drop during the integration time (as shown in FIG. 5), or vary in steps. Yet according to a variant on this alternate method of the invention, also a fixed amplitude reset pulse is used, and a second reference voltage (FIG. 5). This reference voltage is applied to a transistor in between the reset transistor and the supply voltage applied to the drain of the reset transistor.

Figure 6A:
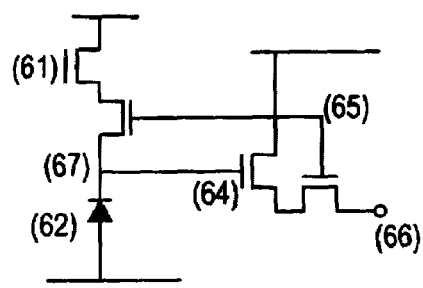
FIGS. 6a and 6b represent pixels for applying alternate embodiments of the invention.
Figure 6B:
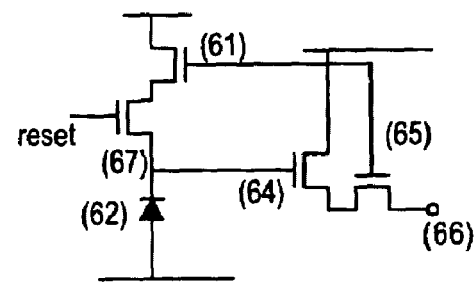
Figure 7:
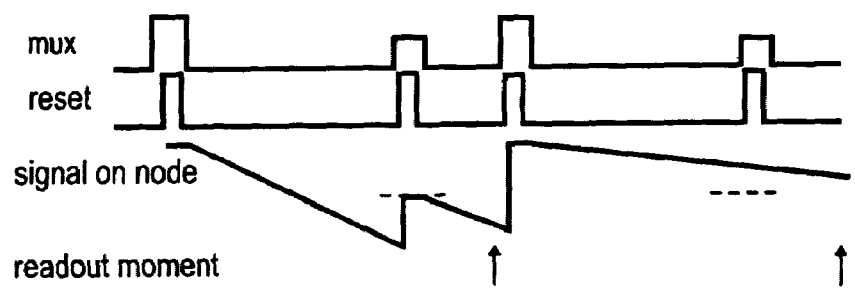
FIG. 7 represents a graph showing an alernate embodiment of the methods of the invention as applied to the pixels of FIG. 6

Other alternate embodiments are shown in FIGS. 6a and 6b and FIG. 7.

Figure 8:
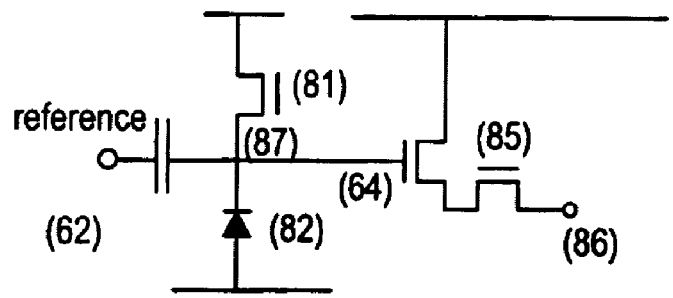
FIG. 8 represents a pixel for applying alternate embodiments of the invention.
Figure 9:
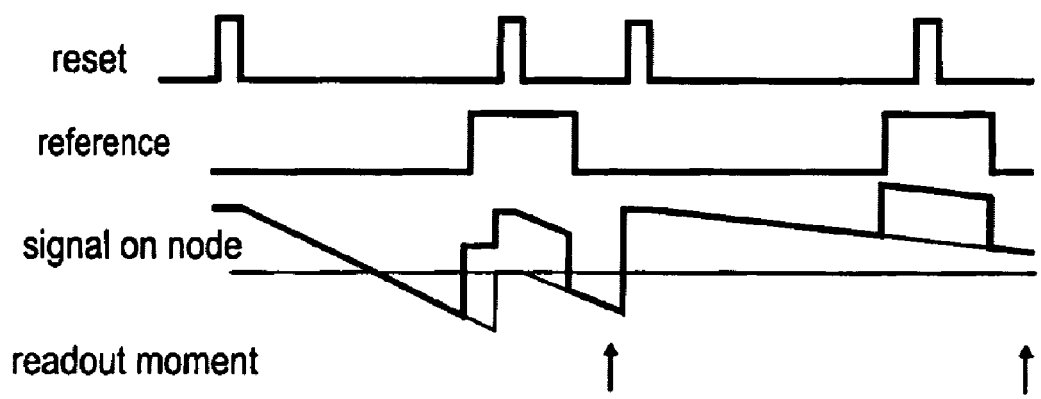
FIG. 9 represents a graph showing an alernate embodiment of the methods of the invention as applied to the pixels of FIG. 8

In yet anther embodiment of the invention, show in FIGS. 8 and 9, the reset pulse occurs twice (or more) during, and interrupting while being applied, the integration time. The reset pulse has a fixed amplitude. A reference signal is applied capacitively to the charge storage node (87), and will result in a shift of the node voltage, hence a shift in the charge level after reset. The signal on the charge storage node (87) is in thick line. The thin dotted line represents the integrated charge on the node, not including the effect of the capacitive coupling of the reference in the node.

In all the above embodiments, two different reset levels are used. It is a straighforward extension to apply 3, more or even a continuously varying level.

Figure 10:
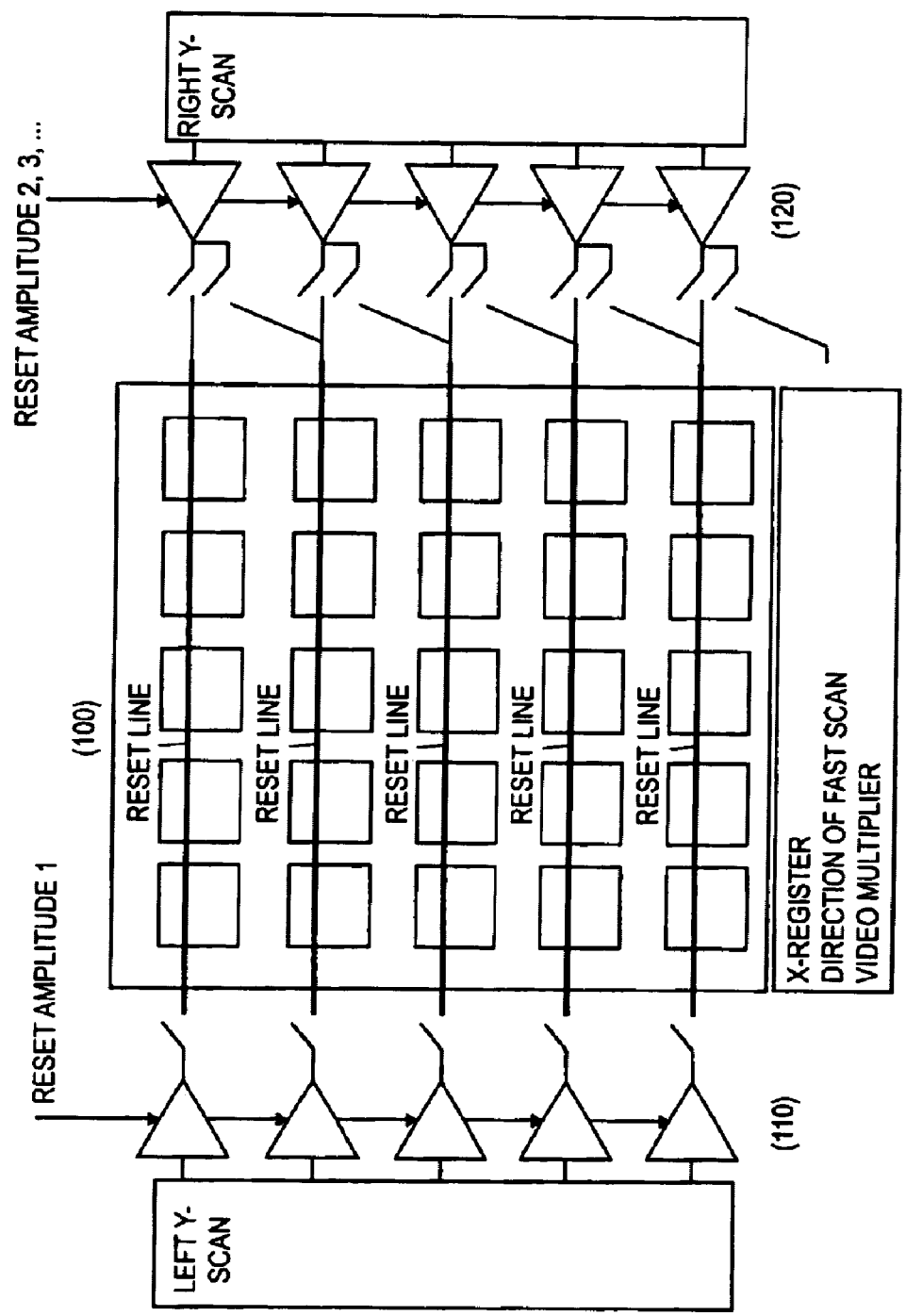
FIG. 10 An implementation of the invention in an image sensor is shown in FIGS. 10 and 11. On an array of pixels (100), the reset pulses can be generated at the edges parallel to the columns of the image sensor. In the implementation of FIG. 10, a main reset pulse for consecutive lines of pixels is generated by the circuitry at the left side of the array (110). A vector of reset line drives is fed by a common "reset amplitude 1". At the right side (120) a similar circuit is present that can apply also pulses or voltages to the reset lines FIG. 11 The circuit of FIG. 10 is able to generate the pulse pattern shown in FIG. 11, as applied on an individual pixel of the sensor.
Figure 11:
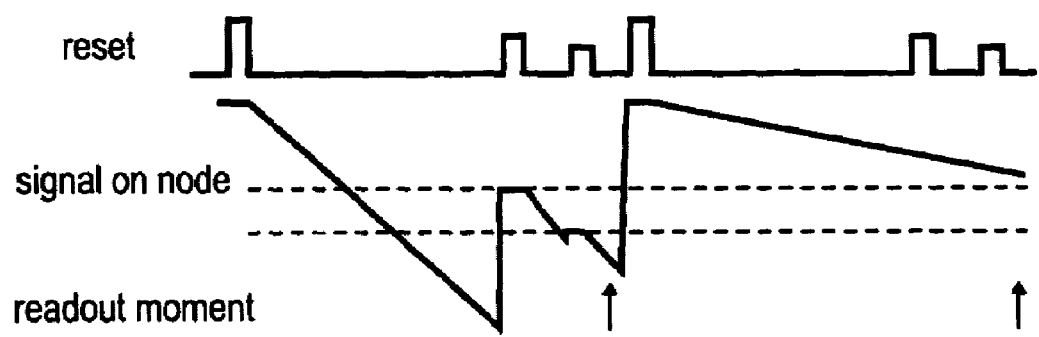

An implementation of the invention in an image sensor is shown in FIGS. 10 and 11. On an array of pixels (100), the reset pulses can be generated at the edges parallel to the columns of the image sensor (110)(120). In the implementation of FIG. 10, a main reset pulse for consecutive lines of pixels is generated by the circuitry at the left side of the array (110). A vector of reset line drives is fed by a common "reset amplitude 1". At the right side (120) a similar circuit is present that can apply also pulses or voltages to the reset lines, but which may have:

different amplitudes occur at different moments in time may act up on different lines, even if driven by the same reset line driver.

In order to allow to choose between the left (110) or right circuit (120) to take action, switches are present on between the reset line drivers and the reset lines. In FIG. 10 it is also schematically indicated that a reset line driver may take action on 2 (more is also possible) lines at choice, also by switches in between the reset line drivers and the reset line. The above circuit is able to generate the pulse pattern shown in FIG. 11, as seen by an individual pixel of the sensor. The result is a pixel response with 3 linear parts.

What is claimed is:

1. A method for obtaining a read-out signal of a pixel having at least a photosensitive element and a charge storage node, the method comprising the steps of while acquiring charge carriers on said charge storage node, said charge carriers being converted from radiation impinging on the photosensitive element:

after a time period applying at least one reset pulse with a predetermined amplitude on said charge storage node, said pulse resetting incompletely the charge carriers acquired at the moment of applying said pulse thereby partially discharging the charge storage node; and thereafter further acquiring charge carriers on said charge storage node.

2. The method as recited in claim 1 wherein a plurality of reset pulses is applied on said charge storage node.

3. The method as recited in claim 2 wherein at least two of said plurality of reset pulses have a different amplitude.

4. The method as recited in claim 1 further comprising the step of applying a reference signal on said charge storage node whereon said reset pulse is superposed.

5. The method as recited in claim 1 wherein said reset pulse is delivered by a reset transistor, said reset transistor being in series with said photosensitive element.

6. The method as recited in claim 1 wherein said photosensitive element has an output node, said charge storage node being the output node of said photosensitive element.

7. The method as recited in claim 6 wherein said photosensitive element has a parasitic capacitor and wherein said charge storage node is the parasitic capacitor of the photosensitive element.

8. The method as recited in claim 1 wherein said pixel further comprises an amplifying element directly or indirectly connected to said charge storage node, the amplifying element amplifying or buffering the signal on said charge storage node for further signal processing.

9. The method as recited in claim 1 wherein the read-out signal is function of a combination of charges acquired prior and after the application of said reset pulses.

10. The method as recited in claim 1 wherein said pixel is implemented in a MOS technology.

11. The method as recited in claim 1 further comprising the step of applying a prior reset pulse on said charge storage node, prior to the step of acquiring charge carriers on said charge storage node.

12. The method as recited in claim 11 wherein during the time of application of said prior reset pulse and during the time of application of said reset pulse on said charge storage node, acquisition of charge carriers is blocked.

13. The method as recited in claim 11 wherein said prior reset pulse is forcing a voltage on said charge storage node and wherein during the time of application of said prior reset pulse on said charge storage node, acquisition of charge carriers is blocked.

* * * * *